US012567428B1

(12) United States Patent
Li et al.

(10) Patent No.: US 12,567,428 B1
(45) Date of Patent: Mar. 3, 2026

(54) CONTACT TRANSDUCER BASED AUDIO ENHANCEMENT

(71) Applicant: Meta Platforms Technologies, LLC, Menlo Park, CA (US)

(72) Inventors: Lin Li, Seattle, WA (US); Tetsuro Oishi, Bothell, WA (US); Gongqiang Yu, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 313 days.

(21) Appl. No.: 17/962,311

(22) Filed: Oct. 7, 2022

Related U.S. Application Data

(60) Provisional application No. 63/254,493, filed on Oct. 11, 2021.

(51) Int. Cl.
*G10L 21/0216* (2013.01)
*G10L 21/0232* (2013.01)
(Continued)

(52) U.S. Cl.
CPC .......... *G10L 21/0232* (2013.01); *H04R 5/033* (2013.01); *H04R 5/04* (2013.01); *G10L 2021/02166* (2013.01)

(58) Field of Classification Search
CPC ........... G10L 2021/02166; G10L 15/22; G10L 21/0232; H04R 5/033; H04R 5/04
See application file for complete search history.

(56) References Cited

U.S. PATENT DOCUMENTS 8,165,875 B2 4/2012 Hetherington et al.
9,330,675 B2 5/2016 Zhang et al.
(Continued)

FOREIGN PATENT DOCUMENTS

CA 3045600 A1 * 7/2018 ............. H04N 5/772
CN 110010143 A * 7/2019 ......... G10L 21/0208
(Continued)

OTHER PUBLICATIONS

Zheng, Yanli, et al. "Air-and bone-conductive integrated microphones for robust speech detection and enhancement." 2003 IEEE Workshop on Automatic Speech Recognition and Understanding (IEEE Cat. No. 03EX721). (Year: 2003).*
(Continued)

*Primary Examiner* — Paras D Shah
*Assistant Examiner* — Oluwadamilola M Ogunbiyi
(74) *Attorney, Agent, or Firm* — Greenberg Traurig, LLP

(57) ABSTRACT

Contact transducer based audio enhancement (e.g., of sounds from a local area, speech of a user, etc.) is described. An audio system includes a microphone array, a contact transducer, and a controller. The contact transducer is in contact with tissue of the user and can detect tissue-based vibrations generated by the speech of the user. The sounds and the detected vibrations are pre-processed. Input parameters are determined using the pre-processed sounds and vibrations. The audio system analyzes the input parameters to determine one or more signal characteristics. The audio system adjusts one or more sound filters to enhance a signal corresponding to the speech of the user based in part on status of the signal characteristics. The audio system performs an action associated with the enhanced signal corresponding to the speech.

20 Claims, 9 Drawing Sheets

(51) Int. Cl.
*H04R 5/033* (2006.01)
*H04R 5/04* (2006.01)

(56) References Cited

U.S. PATENT DOCUMENTS 9,916,841 B2 3/2018 Hetherington et al.
10,297,245 B1 * 5/2019 Chen ................ G10K 11/17853
10,728,649 B1 * 7/2020 Holman ............... H04R 1/1091
10,791,389 B1 * 9/2020 Khaleghimeybodi ....................... H04R 1/1016
10,966,043 B1 * 3/2021 Khaleghimeybodi ....................... H04R 29/001
11,069,365 B2 7/2021 Kar et al.
11,490,092 B2 * 11/2022 Zhao .................... H04N 19/176
2009/0097674 A1 * 4/2009 Watson ..................... B60R 1/12 381/86
2009/0202084 A1 * 8/2009 Joeng ..................... H04R 25/30 381/60
2011/0123031 A1 * 5/2011 Ojala .................... G10L 19/008 381/17
2011/0224481 A1 * 9/2011 Lee ........................ G02C 11/06 600/25
2012/0191447 A1 * 7/2012 Joshi ................... G10L 21/0208 704/226
2013/0051585 A1 * 2/2013 Karkkainen ......... H04R 1/1075 381/151
2015/0222989 A1 * 8/2015 Labrosse .............. H04R 1/1083 381/71.1
2016/0381453 A1 * 12/2016 Ushakov ................. H04M 1/05 381/71.6
2018/0233127 A1 * 8/2018 Visser ................... G10L 13/047
2018/0278967 A1 * 9/2018 Kerofsky ............... H04N 19/98
2018/0367882 A1 * 12/2018 Watts ................... H04R 1/1083
2019/0089550 A1 * 3/2019 Rexach ................ A47K 5/1217
2019/0124454 A1 * 4/2019 Aschbacher ............ G10L 15/20
2019/0227766 A1 * 7/2019 Nahman ................ H04R 27/04
2020/0013395 A1 * 1/2020 Jeong ...................... G10L 15/22
2020/0184996 A1 * 6/2020 Steele ...................... H04R 5/00
2020/0357406 A1 * 11/2020 York ....................... G10L 15/22
2021/0056984 A1 * 2/2021 Zhang ...................... H04S 1/002
2021/0074310 A1 * 3/2021 Bryan .................... H04R 3/005
2021/0089863 A1 * 3/2021 Yang ...................... G06N 3/063
2021/0110841 A1 * 4/2021 Weber ...................... G10L 21/06
2021/0125625 A1 * 4/2021 Huang .................... G10L 25/21
2021/0134312 A1 * 5/2021 Koishida ................ G06V 20/46
2021/0168554 A1 * 6/2021 Zhang .................... H04R 1/105
2021/0256988 A1 * 8/2021 Gallart Mauri .......... G06N 3/04
2021/0266683 A1 * 8/2021 Hersbach ............. H04R 25/407
2021/0321205 A1 * 10/2021 Akers ..................... A61F 11/00
2021/0368255 A1 * 11/2021 Lee ........................ H04R 1/105
2021/0377649 A1 * 12/2021 Lewis .................. H04R 1/1008
2021/0386320 A1 * 12/2021 Lesso ................... A61B 5/7264
2021/0390941 A1 * 12/2021 Lakshminarayanan ...................... H04R 1/1016
2022/0141561 A1 * 5/2022 Wang ................... H04R 1/1075 381/388
2022/0180767 A1 * 6/2022 Aharonson .............. G10G 3/04
2022/0208209 A1 * 6/2022 Zheng .................... H04R 3/005
2022/0284913 A1 * 9/2022 Yu ........................... G10L 25/18
2022/0343887 A1 * 10/2022 Xiao .................... H04R 1/1008
2024/0153518 A1 * 5/2024 Vondersaar ......... G10L 21/0216
2024/0155290 A1 * 5/2024 Hiroe .................. G10L 21/0308
2024/0323616 A1 * 9/2024 Nakamura ............. H04R 25/70

FOREIGN PATENT DOCUMENTS

CN 113270106 A 8/2021
WO WO-2021068120 A1 * 4/2021 ............. G10L 25/30
WO WO-2022089563 A1 * 5/2022
WO WO-2022226696 A1 * 11/2022 ....... G10K 11/17823
WO WO-2022226792 A1 * 11/2022 ............... H04R 1/08

OTHER PUBLICATIONS

Zhou, Yi, et al. “A real-time dual-microphone speech enhancement algorithm assisted by bone conduction sensor.” Sensors 20.18 (2020): 5050. (Year: 2020).*

* cited by examiner

CONTACT TRANSDUCER BASED AUDIO ENHANCEMENT

CROSS-REFERENCE TO RELATED APPLICATIONS

This application claims the benefit of U.S. Provisional Application No. 63/254,493, filed on Oct. 11, 2021, which is incorporated by reference in its entirety.

FIELD OF THE INVENTION

This disclosure relates generally to audio systems, and more specifically to contact transducer based audio enhancement.

BACKGROUND

In noisy environments (e.g., lots of wind noise, loud restaurant, etc.), it can be difficult for conventional audio systems to selectively capture sound from a target acoustic source (e.g., user's own voice, etc.). The selective capture of sound is affected by whether or not the user is speaking, but in noisy environments, the audio system often cannot distinguish between the user speaking and noise from the environment. Conventional audio systems try to mitigate this using voice activity detectors that rely on the temporal and spectral properties of the wearers voice (e.g., being detected via a conventional microphone) being audible over interfering sounds. However, in low acoustic signal-to-noise ratio (SNR) environments (i.e., a noisy environment) this method often fails as the wearers voice is masked by noise.

SUMMARY

Contact transducer based audio enhancement is described. Contact transducer based audio enhancement may be performed by an audio system. The audio system includes a microphone array, one or more contact transducers, and a controller. The microphone array is configured to detect sounds from a local area. The sounds from the local area may include a voice of a user of the audio system and/or environment sounds (e.g., wind, music, traffic, etc.). The contact transducer is configured to be in contact with a portion of a head (e.g., skin on the head or ears) of the user and detect tissue-based (and/or bone-based) vibrations that are generated by the voice of the user. The controller is configured to identify the voice of the user in the detected sounds. The controller may be also configured to detect wind, detect whether a voice (e.g., speech) of the user is present, enhance the voice of the user, or some combination thereof. The controller also is configured to augment the detected tissue-based vibrations corresponding to the voice using portions of the identified voice in the detected sounds over a threshold frequency to generate enhanced speech, and perform an action associated with the enhanced speech.

In some embodiments, a method is described. The method comprises detecting sounds from a local area via a microphone array of an audio system. The sounds from the local area may include speech of a user of the audio system. The method comprises detecting, via a contact transducer that is in contact with tissue of the user, tissue-based vibrations generated by the speech of the user. The method further comprises pre-processing the sounds and the detected vibrations. The method may determine input parameters using the pre-processed sounds and vibrations and analyze the input parameters to determine one or more signal characteristics.

The method may adjust one or more sound filters to enhance a signal corresponding to the speech of the user based in part on status of the signal characteristics. The method further comprises performing an action associated with the enhanced signal corresponding to the speech.

In some embodiments, an audio system is described. The audio system comprises a microphone array, a contact transducer, and a controller. The microphone array is configured to detect sounds from a local area. The sounds from the local area include a voice of a user of the audio system. The contact transducer is configured to be in contact with a portion of a head of the user, and detect tissue-based vibrations that are generated by the voice of the user. The controller is configured to pre-process the sounds and the detected vibrations. The controller is further configured to determine input parameters using the pre-processed sounds and vibrations. The controller is configured to analyze the input parameters to determine one or more signal characteristics and adjust one or more sound filters based in part on status of the signal characteristics. The controller is configured to perform an action associated with an enhanced signal corresponding to the speech.

In some embodiments, a non-transitory computer-readable storage medium comprises stored instructions. The instructions when executed by a processor of a device, cause the device to detect, via a microphone array of an audio system, sounds from a local area, the sounds from the local area including speech of a user of the audio system. The instructions when executed by a processor of a device, cause the device to detect, via a contact transducer that is in contact with tissue of the user, tissue-based vibrations generated by the speech of the user pre-process the sounds and the detected vibrations. The instructions when executed by a processor of a device, cause the device to determine input parameters using the pre-processed sounds and vibrations. The instructions when executed by a processor of a device, cause the device to analyze the input parameters to determine one or more signal characteristics. The instructions when executed by a processor of a device, cause the device to adjust one or more sound filters based in part on status of the signal characteristics, and to perform an action associated with an enhanced signal corresponding to the speech.

DETAILED DESCRIPTION

Figure 1A:
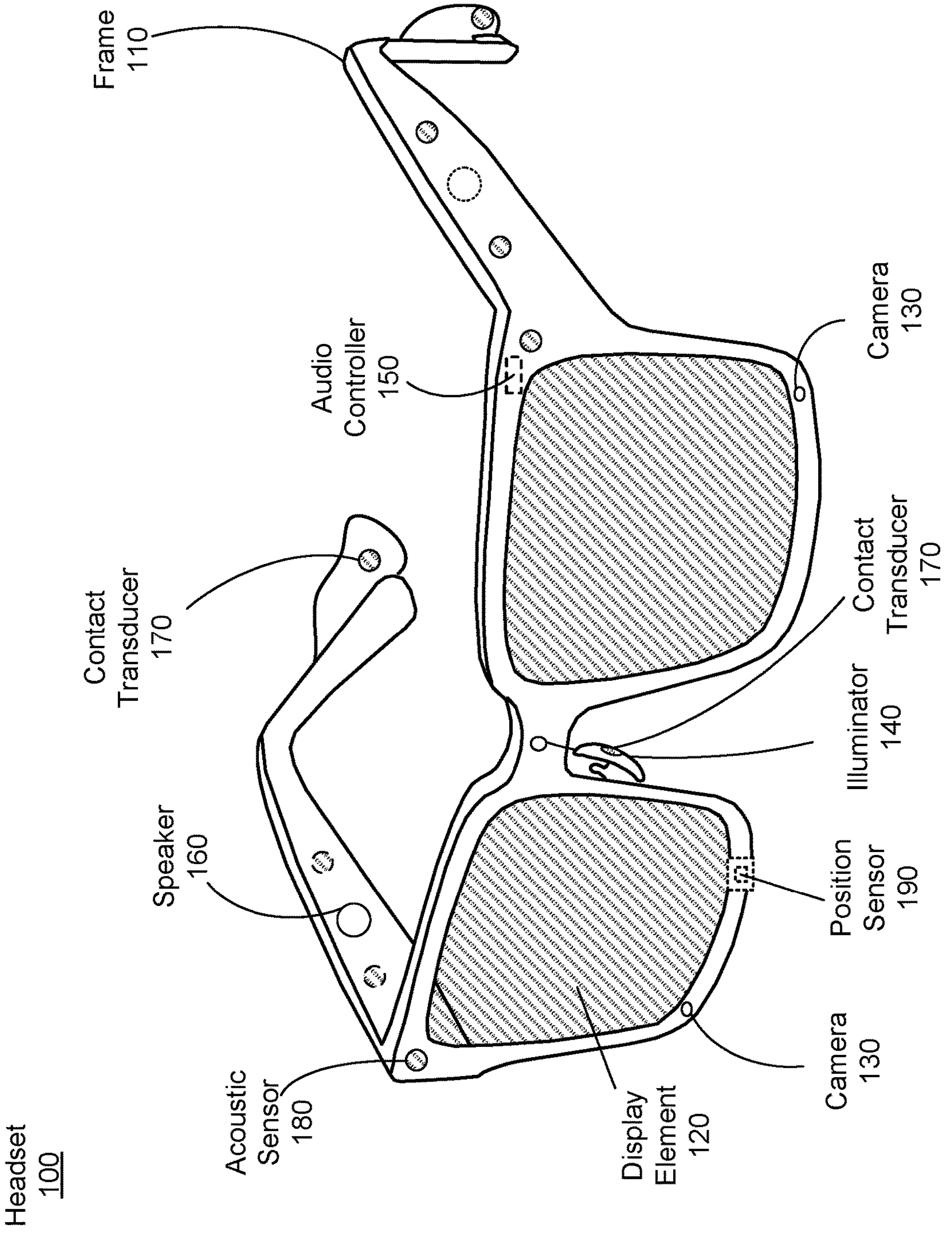
FIG. 1A is a perspective view of a headset implemented as an eyewear device, in accordance with one or more embodiments.

An audio system is described for generating enhanced speech based on audio signal inputs from a contact and sounds from the local area. The audio system includes a microphone array configured to detect sounds from a local area and a contact transducer configured to be in contact with a portion of a head of the user and detect tissue-based vibrations that are generated by the voice of the user. The controller is configured to identify in the detected sounds, whether wind noise is present, whether a voice of the user is present, or some combination thereof. The controller may be further configured to augment audio signals from different sources and enhance audio signals. The controller is configured to augment the detected tissue-based vibrations corresponding to the voice using portions of the identified voice in the detected sounds over a threshold frequency to generate enhanced speech, and perform an action associated with the enhanced speech.

Oftentimes, users are in noisy environments (e.g., outside on a windy day) that can make it difficult for conventional audio systems to separate a user's voice from other sounds/noise in the environment. Embodiments discussed herein relate to contact-microphone based speech enhancement, wind noise detection, and voice detection. The audio system may generate enhanced signals using inputs from both a microphone array and one or more contact transducers. The audio system may combine the signals from the two sound sources for enhanced signals. For example, the high frequency component of the contact transducer is attenuated, but the user's voice detected through the contact transducer is less sensitive to the interference of the ambient acoustic noises and other interference conducted by air. The audio system may make decision for the state of wind noise and/or the user's voice. For example, the audio system may determine whether wind noise or a user's voice is detected. If the audio system determines that the user's voice is detected through the transducer, the audio system may use a portion of the audio signals from the contact transducer with frequency lower than a threshold. The audio system may combine the portion of signal data with the portion that is missing from the audio signals collected through the contact transducer but picked up by the microphone array and generate enhanced signals that is more robust to interference of environmental noises.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, earpiece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds. The sensor array 220 includes one or more contact transducers 170 that are configured to be in contact with a portion of a head of the user and detect tissue-based vibrations that are generated by the voice of the user. As illustrated, the one or more contact transducers 170 are located on the nose pad and/or on the temples. In other embodiments, some or all of the one or more contact transducers 170 are located on other locations of the headset 100. The sensor array is discussed in further detail in accordance with FIG. 2.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

In one embodiment, the audio controller 150 may be configured to identify in the detected sounds, whether wind noise is present, whether a voice (e.g., speech) of the user is present, or some combination thereof. The audio controller 150 may be further configured to augment audio signals from different sources (e.g., microphones, contact transducer, etc.), and enhance audio signals. The audio controller 150 is configured to augment the detected tissue-based vibrations corresponding to the voice using portions of the identified voice in the detected sounds over a threshold frequency to generate enhanced speech, and perform an action associated with the enhanced speech. The audio controller 150 is discussed in further detail below in accordance with FIG. 2.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room.

Figure 1B:
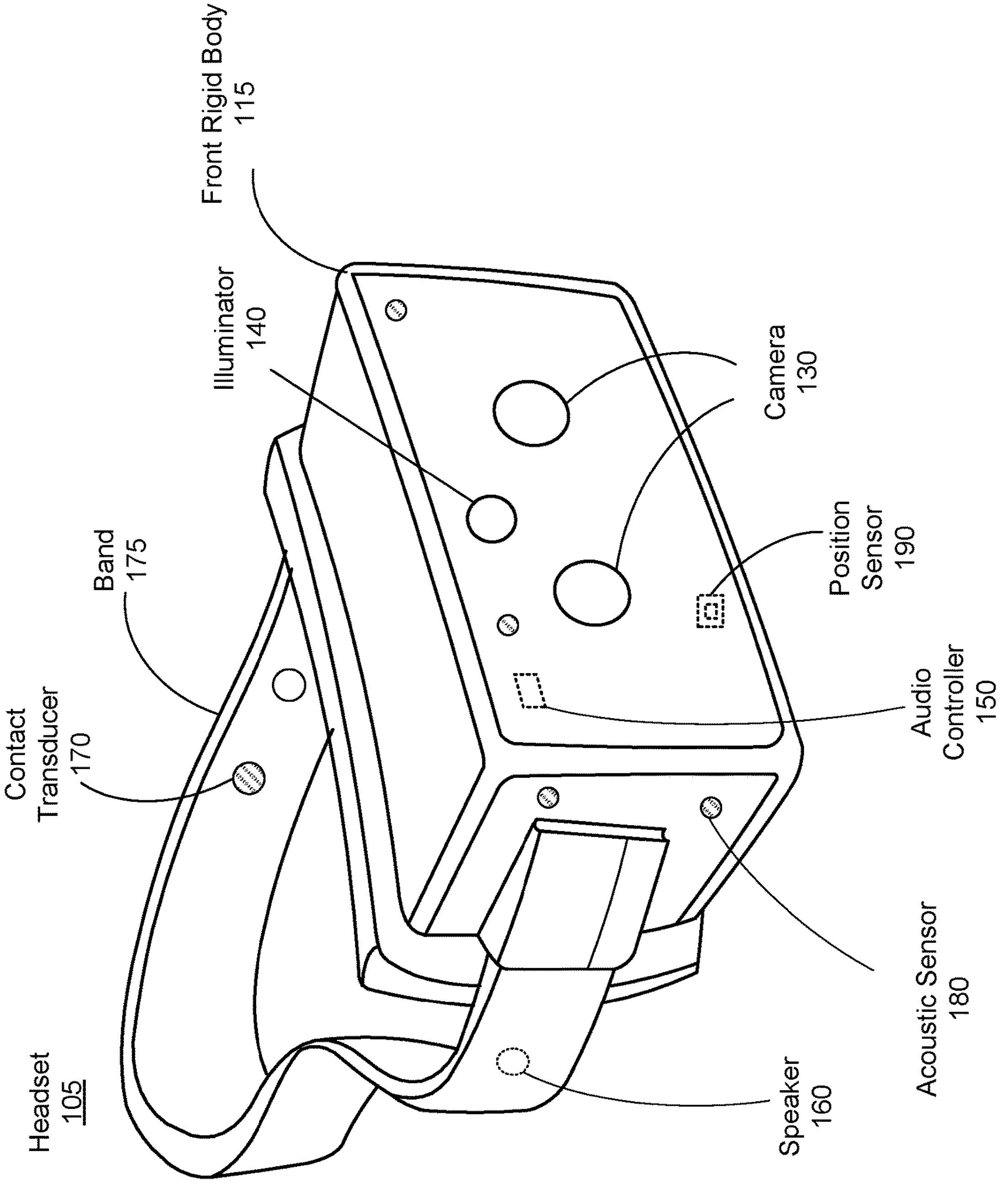
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
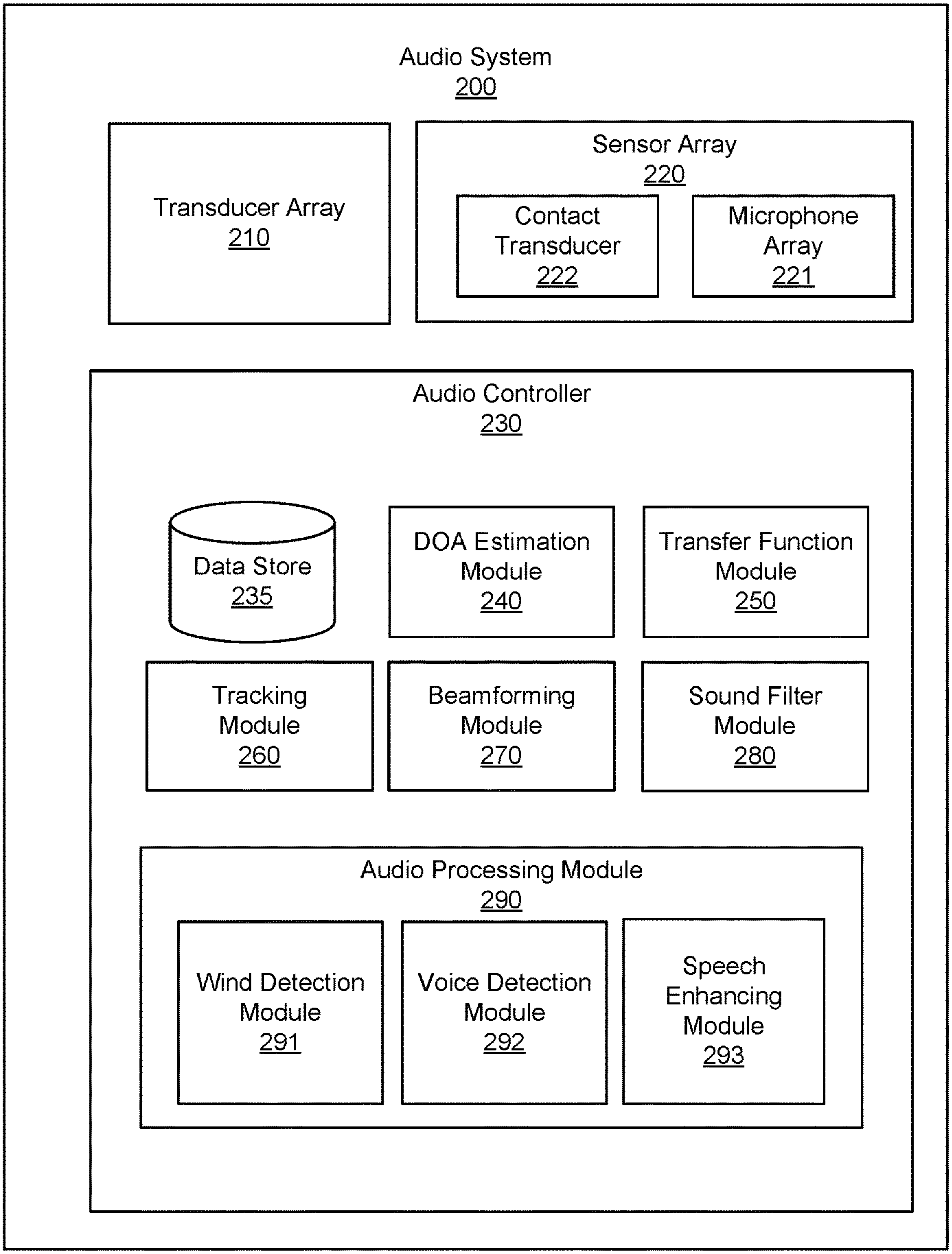
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 includes a contact transducer 222 and a microphone array 221. The sensor array 220 includes a plurality of acoustic sensors (e.g., microphone array 221) that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, for example, a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area. The sensor array 220 also includes a contact transducer 222. A contact transducer 222 is configured to be in contract with a portion of a head of the user. For example, the contact transducer 222 may be in contact with skin of the head of a user, or the contract transducer 22 may be in contact with the skin around the user's mouth. In some embodiments, the sensor array 220 may include a plurality of contact transducers 222 that each detects vibrations of a portion of a head of the user.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, sounds collected by the microphone array 221, audio signals detected by the contact transducer 222, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 9).

The sound filter module 280 provides the sound filters to the transducer array 210. In some embodiments, the sound filters may cause positive or negative amplification of sounds as a function of frequency.

The audio processing module 290 may process audio data based on audio signals. The audio processing module may enhance audio signals using audio signals gathered by the transducer array 210 and the sounds detected by the sensor array 220. The audio processing module 290 may include a wind detection module 291 that detects a state associated with detected wind sounds, a voice detection module 292 that determine whether a user's voice is detected, and a speech enhancing module 293 that generates enhanced signals for a speech. The audio processing module 290 may perform an action based on the enhanced signals. In one embodiment, the audio processing module 290 may analyze the speech to determine a user command. A user command as used herein may be an oral instruction included in the speech). For example, the user command may be "turn up the volume," "set up an alarm at 6:00 am on Monday," etc. The audio processing module 290 may instruct the headset (e.g., the headset 100) to transmit the speech to another audio system. For example, the audio processing module 290 may enhance the audio signals and send the enhanced signals to another audio system for communication with another user.

The wind detection module 291 may determine a state associated with wind noise in the detected sounds. The wind detection module 291 may implement a real time wind noise detection algorithm that makes decision for a state of the wind noise. The wind detection module 291 may output a binary result such as that the wind noise is detected or that the wind noise in not detected. The wind detection module 291 may perform wind noise detection (WND), which detects whether wind noise is present in detected sounds. The determination of wind noised may be used to reduce interference of wind noises, and therefore, the accuracy and success of wind detection can affect performance of speech enhancement. In one embodiment, the wind detection module 291 may use time domain methods such as Zero Cross Rate and Short Term Mean and frequency domain methods such as Average Power Spectrum (APS), Negative Slot Fit, Sub-band Spectrum Centroids (SSC) and Template Spectrum Combination. The methods based on inter channel coherence (ICC) and magnitude squared coherence (MSC) achieve better WND performance than that of single channel. In some embodiments, the outputs may be a level of strength associated with the wind noise. The wind detection module 291 is discussed in greater detail in accordance with FIG. 4.

The voice detection module 292 may determine a state associated with a user's voice in the detected sounds. The voice detection module 292 may use inputs from both channels (e.g., the microphone arrays 221 and the contact transducer 222) for analysis. The voice detection module 292 may make a decision whether a user's voice is present in the detected sound. In one embodiment, the voice detection module 292 may determine a state associated with the users voice, such as that a user's voice is present or that a user's voice is not present. The voice detection module 292 is discussed in accordance with FIG. 5.

The speech enhancing module 293 may generate enhanced audio signals based on the analysis of the wind detection module 291 and the voice detection module 292. The speech enhancing module 293 may apply various methods for adjusting the filters to improve the audio signals. In one embodiment, the speech enhancing module 293 may combine the signals from the two sound sources for enhanced signals. For example, the high frequency component of the contact transducer 222 is attenuated, but the user's voice detected through the contact transducer 222 is less sensitive to the interference of the ambient acoustic noises and other interference conducted by air. The speech enhancing module 293, may determine that the user's voice is detected through the transducer 222 and use a portion of the audio signals from the contact transducer 222 with frequency lower than a threshold. The speech enhancing module 293 may combine the portion of signal data with the portion that is missing from the audio signals collected through the contact transducer 222 but picked up by the microphone array 221 and generate enhanced signals. The speech enhancing module 293 is discussed in accordance with FIG. 6. A general process including functionalities performed by the audio processing module 290 is discussed in accordance with FIG. 3.

Figure 3:
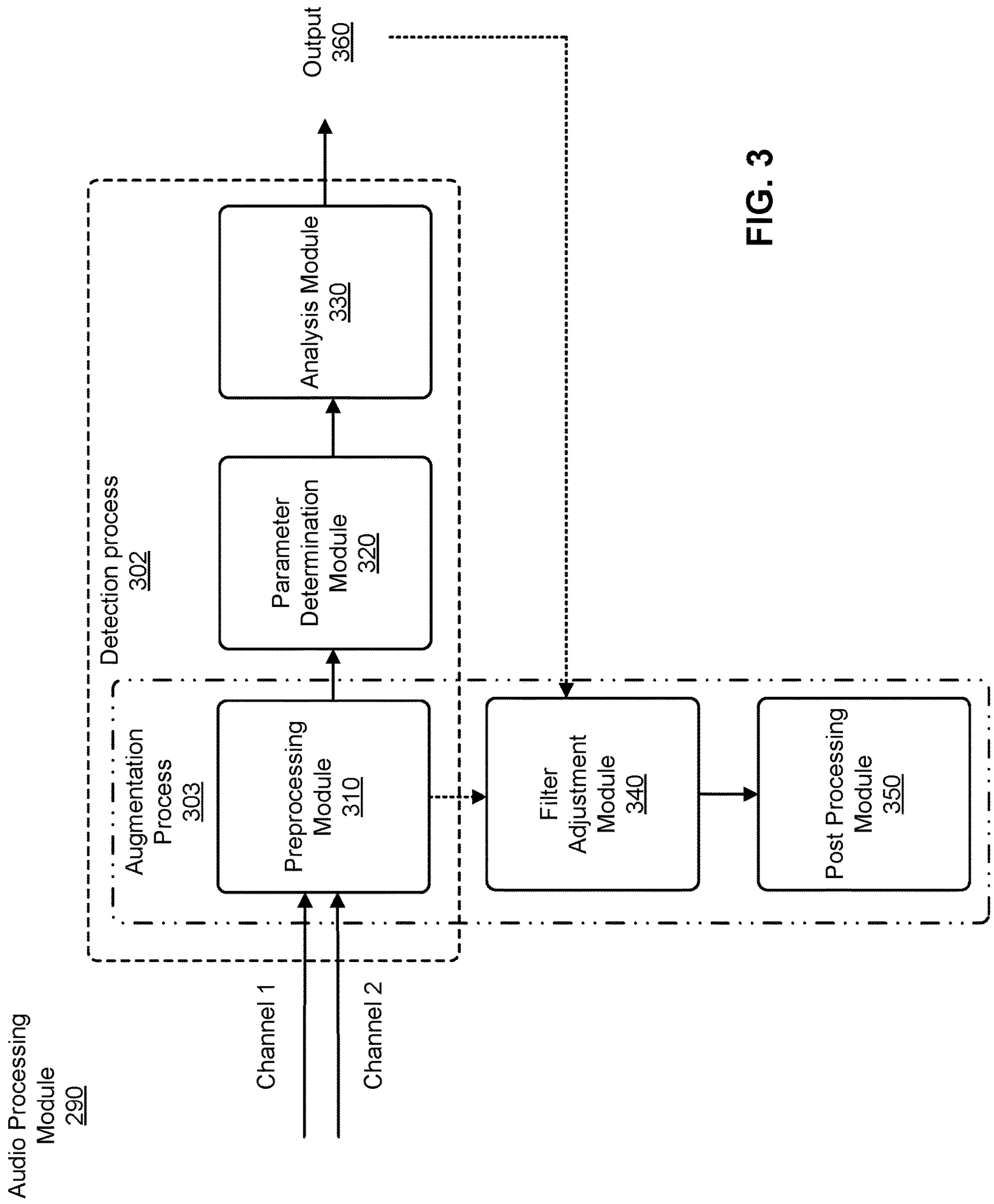
FIG. 3 is a flow chart illustrating a general process for audio processing, in accordance with one or more embodiments.

FIG. 3 illustrates a general process performed by the audio processing module 290, in accordance with one or more embodiments. The audio processing module 290 may perform a detection process 302 comprising a preprocessing module 310, a parameter determination module 320, and an analysis module 330. The detection process 302 may produce an output 360 including determining a state associated with a type of sound. For example, the output 360 may be a decision that the wind noise is present, the wind noise is not present, a voice of a user is present, or the voice of the user is not present. The audio processing module 290 may receive inputs from channel 1 through the contact transducer 222 and receive inputs from channel 2 through the microphone array 221. Inputs from channel 1 are audio signals gathered by the contact transducer 222 (e.g., generated based on vibrations in the skin of the user caused by the voice of the user). Inputs from channel 2 are gathered by the microphone array 221 (e.g., sounds including both environmental sounds, the voice of the user, or both).

The preprocessing module 210 may preprocess the collected audio inputs from channel 1 and channel 2 and prepare the audio inputs for further processing. The preprocessing module 310 may perform audio segmentation on the data received from channel 1 and channel 2, where the audio segmentation separates different types of sound based on signal frequencies. The preprocessing module 310 may perform audio windowing on the segmented data, the windowing focusing on a subset of the audio signals for analyzing its frequency content. The preprocessing module 310 may perform Short-Time Fourier Transform (STFT) and weighted overlap add (WOLA) to the audio inputs after segmentation and windowing for further analysis. The audio segmenting, audio windowing, and Short-Time Fourier Transform (STFT) and weighted overlap add (WOLA) are further discussed in accordance with segmentation module 410, windowing module 420, and STFT/WOLA module 430 in FIG. 4.

Figure 4:
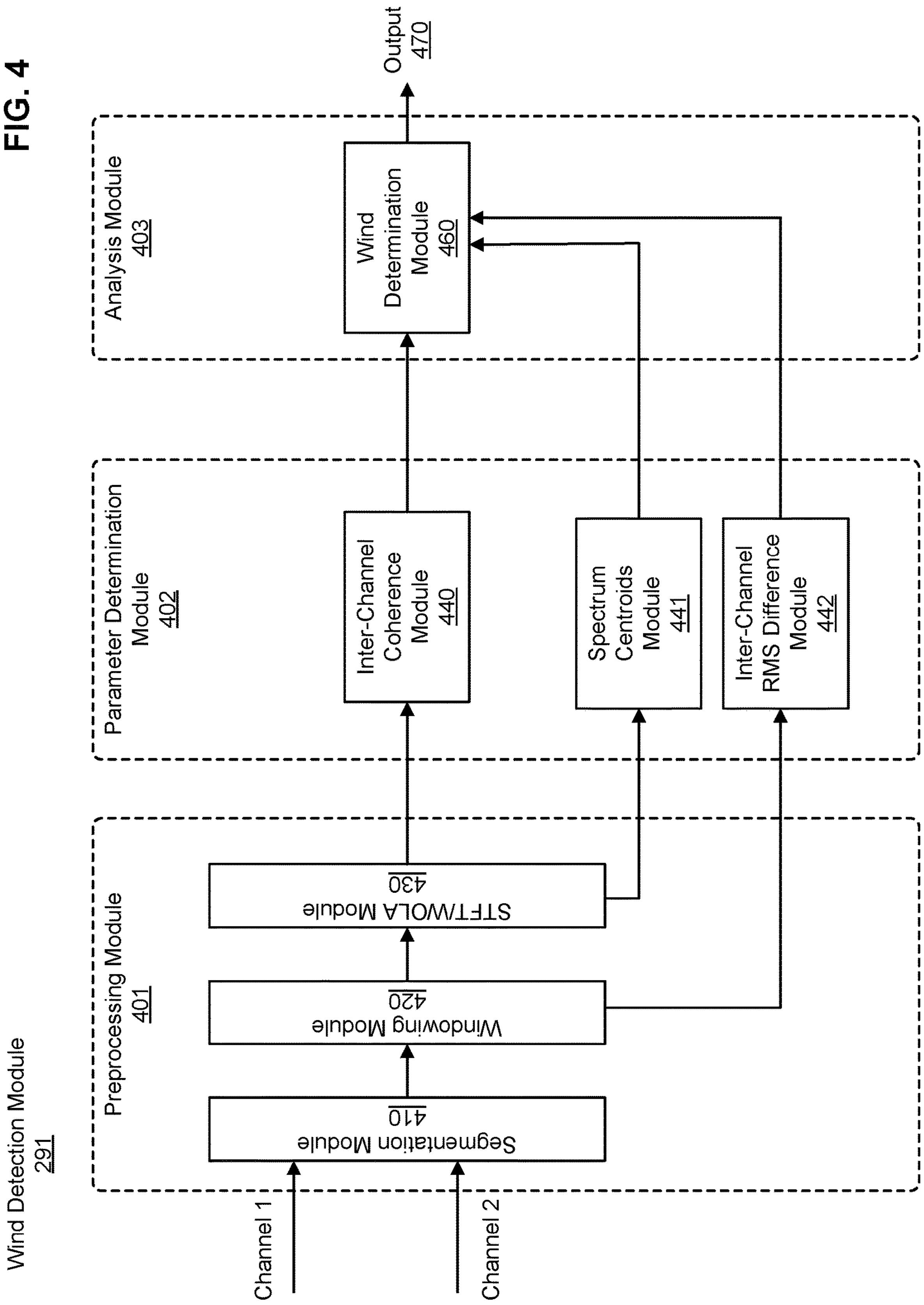
FIG. 4 is a flow chart illustrating a wind detection process, in accordance with one or more embodiments.

The parameter determination module 320 may determine various signal characteristics define based on the preprocessed audio signals. Signal characteristics, as used herein, may also be referred to as a state of the signal. The various signal characteristics may include one or more of the following: wind noises are present, wind noises are not present, a voice of a user is present, and a voice of a user is not present. The parameter determination module 320 may determine parameters associated with audio inputs such as inter-channel coherence, spectrum centroids, and inter-channel root mean square difference for the inputs from channel 1 and channel 2. The parameter determination module 320 may extract the parameters which are then used for analysis by the analysis module 330. The parameter determination module 320 is discussed in further detail in accordance with the parameter determination module 320 as illustrated in FIG. 4

The analysis module 330 may determine a state as output 360 associated with audio signals. The analysis module 330 may determine whether wind noise (or other types of noises) is detected in the sounds. The analysis module 330 may also determine whether a user's voice is detected in the sounds. In some embodiments, the analysis module 330 may determine the state to be a level of strength associated with the wind noise, or a level of strength associated with the user's voice. The detection process 302 may make a decision as output 360, where the decision may be one or more of the following: wind noises are present, wind noises are not present, a user's voice is present, and a user's voice is not present. The output 360 may be used in other processes such as the augmentation process 303. The analysis module 330 may be discussed in further detail in accordance with the analysis module 330 in FIG. 4 and FIG. 5.

The audio processing module 290 may also perform an augmentation process 303 that augments inputs from channel 1 301 and channel 2 302. In one embodiment, the augmentation process 303 may combine a portion from the signals from each channel to produce enhanced signals. The augmentation process 303 may combine the signals based on the output 360, which is the decision of the state of whether wind noises or user's voices are present in detected sounds. The augmentation process may include the preprocessing module 310, the filter adjustment module 340, and the post processing module 350. For example, the high frequency component of the contact transducer is attenuated, but the user's voice detected through the contact transducer is less sensitive to the interference of the ambient acoustic noises and other interference conducted by air. The augmentation process may combine a portion of the audio signals from the contact transducer with frequency lower than a threshold with the portion that is missing from the audio signals collected through the contact transducer but picked up by the microphone array and generate enhanced signals.

The filter adjustment module 340 may apply various filters for adjustments on the audio signals for speech enhancement. The filter adjustment module 340 may apply filter adjustments on combined signals from channel 1 and channel 2 for generating enhanced signals for the user's speech. The filter adjustment module 340 may apply different techniques to process the audio signals such as an equalization method, linear model-based method, or high-pass filter and low-pass filter method. The filter adjustment module 340 is discussed in greater detail in accordance with FIG. 6.

The post-processing module 350 may reverse the effects caused by the preprocessing module 310 such as audio segmenting and audio windowing. The post-processing module 350 may reverse and combine the segmented signals and produce results for outputs. The post processing module 350 may perform functionalities such as inverse segmenting the audio signals, windowing module, and a combination module. The post-processing module and the inverse segmentation module 650, the windowing module 660, and the combination module 670 are discussed in further detail in accordance with the post-processing module 350 in FIG. 6

FIG. 4 is a process flow for wind detection performed by the wind detection module 291, in accordance with one or more embodiments. As shown in FIG. 4, the controller receives a signal from a contact transducer 222 on Channel 1 and from the microphone array 221 on Channel 2. The wind detection module 291 may include a preprocessing module 401, a parameter determination module 402, and an analysis module 403. The preprocessing module 401 may be an embodiment of the preprocessing module 310, the parameter determination module 402 may be an embodiment of the parameter determination module 320, and the analysis module 403 may be an embodiment of the analysis module 330. The functionalities performed by the preprocessing module 401, the parameter determination module 402, and the analysis module 403 may be the same as the functionalities performed by the preprocessing module 310, the parameter determination module 320, and the analysis module 330. In some embodiments, the functionalities performed by the preprocessing module 401, the parameter determination module 402, and the analysis module 403 may include variations from the preprocessing module 310, the parameter determination module 320, and the analysis module 330.

The preprocessing module 401 may process inputs and prepare the audio signals ready for subsequent modules. The preprocessing module 401 may include a segmentation module 410, a windowing module 420, and a STFT/WOLA module 430. The inputs may be first segmented by the segmentation module 410. The segmentation module 410 may segment the audio stream into homogeneous regions such as separating the audio stream into different types of sounds. The segmentation module 410 may separate the audio stream for handling regions of different nature differently. The segmentation module 410 may segment the audio inputs based on user-defined intervals. In one embodiment, the segmentation module 410 may use clustering algorithms for segmenting the audio streams.

The windowing module 420 may split the segmented audio signals into temporal segments and smooth the boundaries caused by the segmentation module 410. The borders of the segments produced by the segmentation module 410 may be visible as discontinuities. As illustrated in FIG. 4, one arrow is shown for simplicity, while in reality, the segmentation module 410 may produce segmented data for each channel. The windowing module 420 may reduce the impact of segmenting by applying windowing to the temporal segments. The windowing functions may be smooth functions which go to zero at the borders. The windowing module 420 may multiply the input signals with a window function, such that the signals go to zero at the border while preserving the significant signal characteristics. As illustrated in FIG. 4, one arrow is shown for simplicity, while in reality, the windowing module 420 may produce windowed data for each channel.

The STFT/WOLA module 430 may apply Short-Time Fourier Transform (STFT) and Weighted Overlap-Add (WOLA) to windowed audio signals. The STFT/WOLA module 430 may apply transforming functions to audio signals to determine the sinusoidal frequency and phase content of local sections of a signal as it changes over time. The STFT/WOLA module 430 may divide a longer time signal into shorter segments of equal length and then compute the Fourier transform separately on each shorter segment, which may reveal the Fourier spectrum on each shorter segment. The transformed audio signals produced by the STFT/WOLA module 430 may be further processed by the parameter determination module 320.

The parameter determination module 402 may process the signals and generate various parameters extracted from the input signals passed from the preprocessing module 401. The parameter determination module 402 may include an inter-channel coherence module 440, a spectrum centroids module 441, and an inter-channel RMS difference module 442.

The inter-channel coherence module 440 may take content from both channels to the inter-channel coherence (ICC) module 440 and determines inter-channel coherence based on the processed signals. The inter-channel coherence may indicate a degree of correlation between different windows of the input signals. The inter-channel coherence may be a value between 0 and 1, with 0 indicating no correction between two datasets and 1 indicating the strongest correlation. Because the acoustic generation process of wind noise is given by turbulences, which are close to the microphones and can be seen as a vast number of independent sound sources for each microphone, a diffuse sound field is created. Thus, a low correlation is assumed for wind noise. A speech signal is usually represented by a point source creating a coherent sound field, resulting in a high correlation.

The parameter determination module 402 may pass the audio signals from channel 1, which is the pre-processed audio signals from the contact transducer 222 to a spectrum centroids module 441. Spectrum centroids, similar to formant frequency, are widely used in speech and speaker recognitions. The spectrum centroids module 441 may determine the centroids for the channel 1 spectrum, which contains structure information of the speech signal, making the spectrum centroids useful to discriminate the speech signal and wind noise-especially for the VPU (voice pickup, signals from the contact transducer 222).

The parameter determination module 402 may pass the signals processed by the windowing module 420 to an inter-channel RMS (root mean square) difference module 442. The inter-channel RMS difference module 442 may calculate root means square differences for the input signal dataset. The root mean square difference may be a useful feature measure to identify wind noise signals in multiple channels because the root mean square difference may indicate a distance between different datasets, which may indicate a correlation between the input signals. The inter-channel RMS difference module 442 may calculate the RMS difference and use the RMS differences as a measurement for determining whether the sound source is a point source (e.g., a speaker) or from a number of independent sound sources (e.g., wind noise).

The analysis module 403 may combine inputs from both the microphone array 221 and inputs from the contact transducer 222 to implement a real time wind noise detection algorithm that makes decision for a state (outputs 470) of the wind noise. The analysis module 403 may include a wind determination module 460 that determines a state associated with wind noise in the detected sounds. The outputs 470 may be a binary result such as that the wind noise is detected or that the wind noise in not detected. In some embodiments, the outputs may be a level of strength associated with the wind noise.

The wind determination module 460 may use parameters outputted from the Inter-Channel Coherence module 440, Spectrum Centroids module 441, and the Inter-channel RMS difference module 442, to determine whether or not wind noise is present in the audio signals from the microphone array. For example, one of the important characteristics of wind noise is that the signal energy is mostly concentrated below 1000 Hz. Therefore, the wind determination module 460 may use the lower frequency power spectrum of the input signal as a feature measure to distinguish wind noise from general audio signals. The wind determination module 460 may use the parameters generated by the inter-channel coherence module 440, spectrum centroids module 441, and the inter-channel RMS difference module 442 for wind determination, as the inter-channel coherence, spectrum centroids and inter-channel RMS differences may make the characteristics of the audio streams visible. In one embodiment, the wind determination module 460 may train or further refine a machine learning model for taking the parameters generated by the parameter determination module 402 as input, and the machine learning model is trained to output a binary result of whether wind noises are detected.

In some embodiments, the wind determination module 460 may train the machine learning model to output a level of strength associated with detected wind noises. In one embodiment, the wind determination module 460 may make a decision based on heuristic methods. Each parameter (e.g., the inter-channel coherence, spectrum centroids and inter-channel RMS differences) may be associated with a threshold level, the threshold may be determined by a human expert in the field. The wind determination module 460 may make a decision that wind noise is present if a predetermined number of parameters meet the requirement. If a deficient number of parameters, or the parameters do not meet the thresholds, the wind determination module 460 may determine that wind noises are not present. The outputs 470 may be passed to the speech enhancing module 293 for adjusting combined signals.

Figure 5:
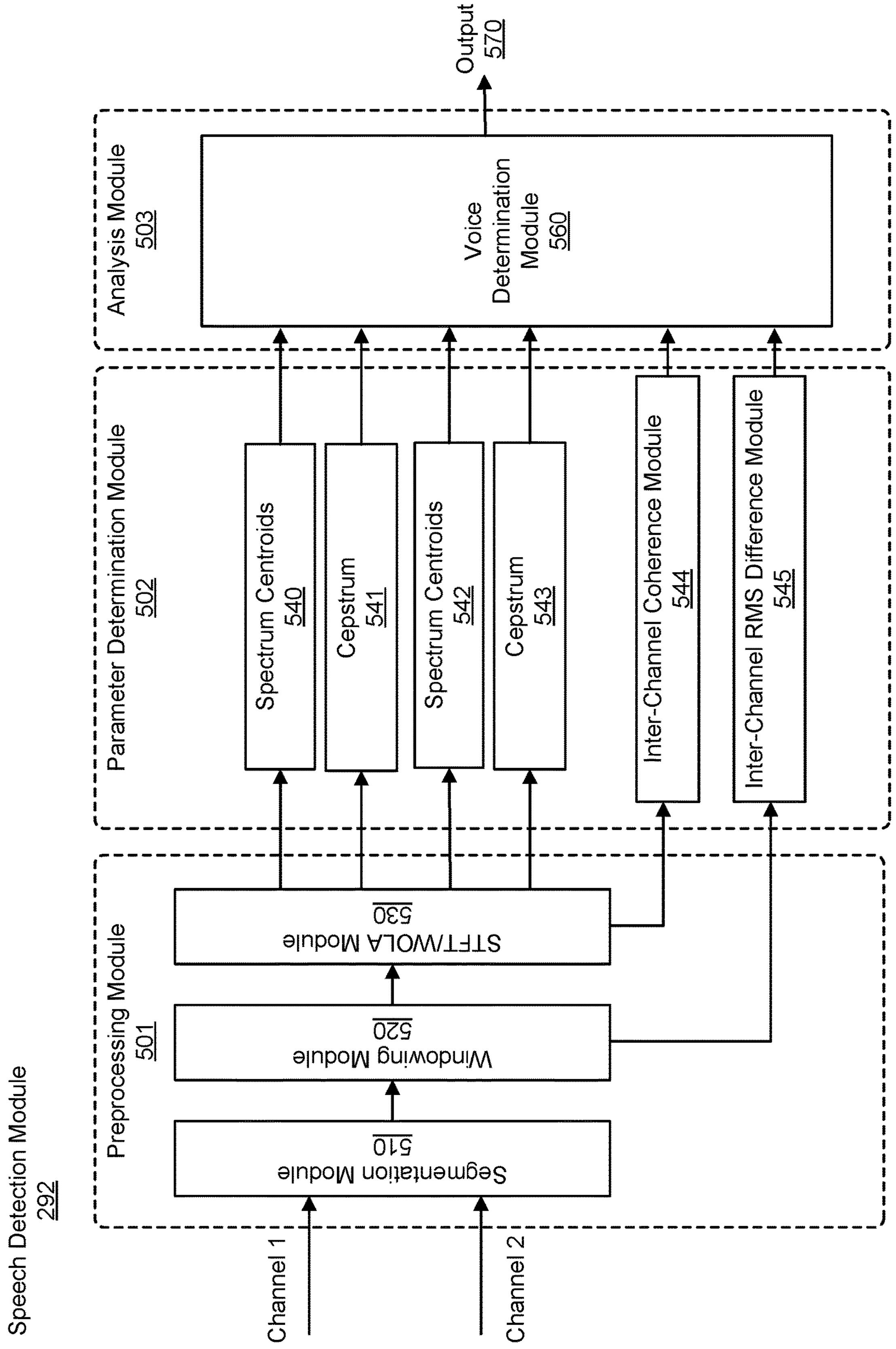
FIG. 5 is a flow chart illustrating a voice detection process, in accordance with one or more embodiments.

FIG. 5 is a process flow for voice detection performed by the voice detection module 292, in accordance with one or more embodiments. The voice detection module 292 may include a preprocessing module 501, a parameter determination module 502, and an analysis module 503. The functionalities performed by the preprocessing module 501, the parameter determination module 502, and the analysis module 503 are substantially the same as the functionalities performed by the preprocessing module 310, the parameter determination module 320, and the analysis module 330.

The preprocessing module 501 may process received signals. The voice detection module 292 may receive inputs from channel 1 and channel 2 and pass the inputs to the preprocessing module 501 for preprocessing. The preprocessing model 501 may separate the inputs using the segmentation module 510, window the segmented inputs using the windowing module 520, and perform transformation on the inputs using the STFT/WOLA module 530. Functionalities of the segmentation module 510, windowing module 520, and the STFT/WOLA module 530 are similar to the functionalities performed by the segmentation module 410, windowing module 420, and the STFT/WOLA module 430. The pre-processed signals are then passed to the parameter determination module 502 for extracting signal characteristics from the audio signals for determining whether a user's voice is detected in the sounds.

The parameter determination module 502 may extract spectrum centroids and cestrum from audio signals. The parameter determination module 502 may extract spectrum centroids 540 and cepstrum 541 based on audio signals from channel 1, and extract spectrum centroids 542 and cepstrum 543 based on audio signals from channel 2. The parameter determination module 320 may analyze the signals in time domain, and for each time domain the signals are in spectral domain. The parameter determination module 502 may also analyze the signals in frequency domain, and amplitude of such signal is taken to analyze the signals in cepstral domain. In other words, the parameter determination module 502 may extract spectral features such as spectrum centroids 540 and 542, and cepstral features such as cepstrum 541 and 543 for detecting periodicity in time domain and frequency spectrum.

The parameter determination module 502 may also extract features including inter-channel coherence and inter-channel RMS difference. The parameter determination module 320 may calculate inter-channel coherence and inter-channel RMS differences for audio signals from different segmentations to determine if the datasets from different segmentations are correlated. The parameter determination module 502 may use the correlation as a factor for determining characteristics of the sound source. The inter-channel coherence and inter-channel RMS difference contain lots of structure information of a speech signal. The voice determination module 560 may take the parameters generated by the parameter determination module 502 as input and generates output 570. The voice determination module 560 is discussed in further detail below.

The analysis module 503 may use a voice determination module 560 for making a decision whether a user's voice is detected in the sounds. Because the contact transducer has strong capability to mitigate external acoustic or wind noise, combined with the microphone array, the voice determination module 560 may use inputs from both channels (i.e., the contact transducer 222 and the microphone array 221) to provide more accurate decision. The voice determination module 560 may use signals from the microphone array 221 and the contact transducer 222 to determine whether or not the user is speaking. Based on the characteristics of speech and noise, the voice determination module 560 may determine that the inter channel coherence may be lower when two nearby microphones pick up noise than when they pick up acoustic signals, because the propagation speed of connective airflow is much less than that of the acoustical signals and the differences of sound source properties. Therefore, the voice determination module 560 may use the inter channel coherence as a distinguishing parameter for speech and noise.

In some embodiments, the voice determination module 560 may train and apply a model that takes the parameters generated by the parameter determination module 502 as input, and generates an output 570, which is a state associated with the voice determination, such as whether a user's voice is detected. The voice determination module 560 may train a machine learning model and adjust the parameters and conduct tuning on the parameters. For example, the voice determination module 560 may tune the Cepstrum parameter so that the Cepstrum will not be sensitive to the SNR (signal-to-noise ratio) values. The voice determination module 560 may train the machine learning model based on a combination of parameters generated by the parameter determination module 560. In some embodiments, the voice determination module 560 may adjust the weights for different parameters. For example, the voice determination module 560 may weigh more towards the RMS difference and Spectrum Centroid. The weights may be adjusted by the machine learning model in the training process, or the weights may be set up based on human instructions.

The determination from the wind detection module 291 and the determination from the voice detection module 292 may be used for making decision with regard to how to combine the inputs from channel 1 and inputs from channel 2 to produce the final enhanced signals. The speech enhancing module 293 is further discussed in accordance with FIG. 6.

Figure 6:
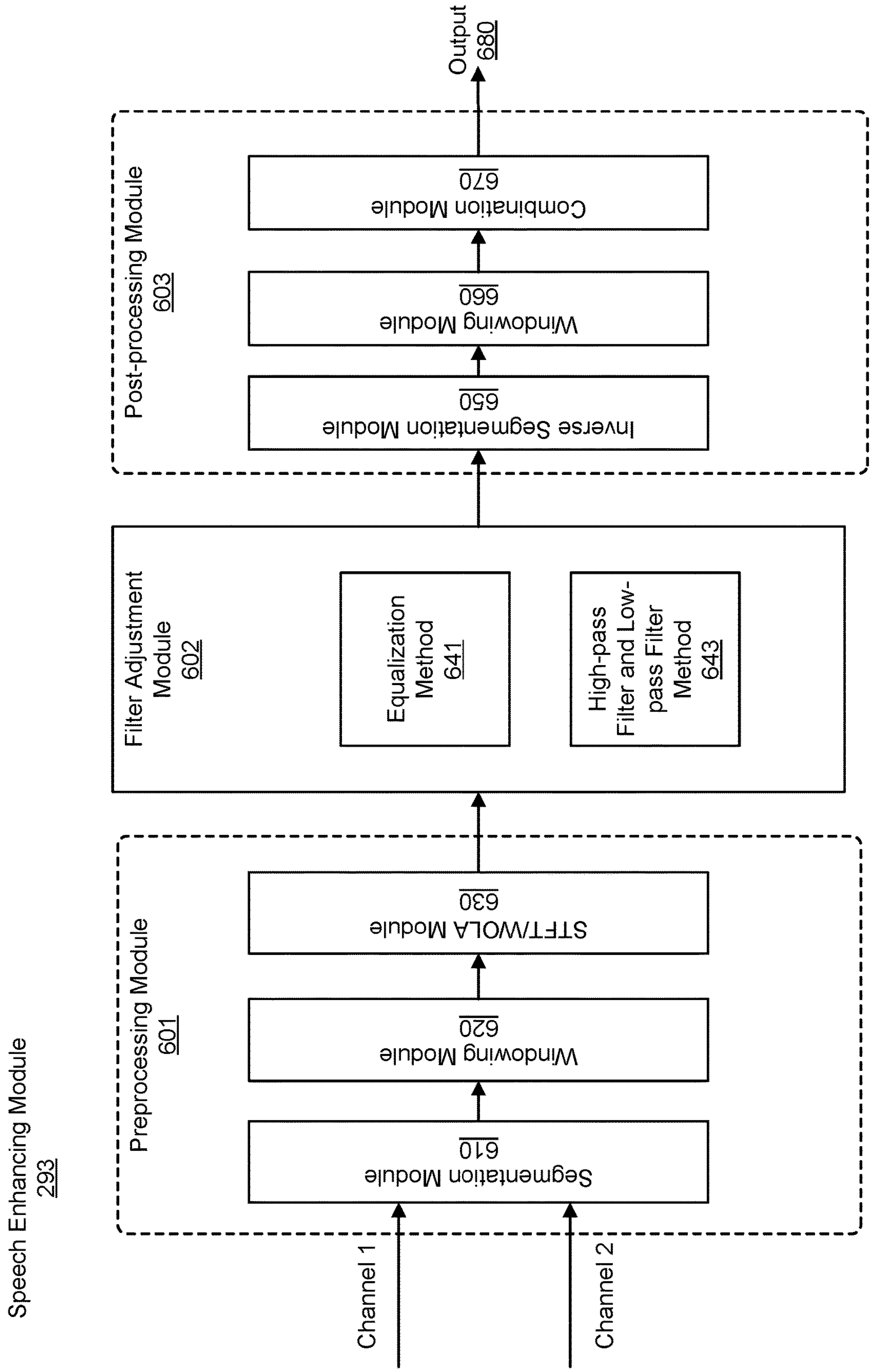
FIG. 6 is a flow chart illustrating a speech enhancement process, in accordance with one or more embodiments.

FIG. 6 is a process flow for a speech enhancement process performed by the speech enhancing module 293, according to one or more embodiments. As illustrated in FIG. 6, the speech enhancing module 293 may include a preprocessing module 601, a filter adjustment module 602, and a post-processing module 603. The functionalities of the preprocessing module 601, the filter adjustment module 602, and the post-processing module 603 are substantially the same to the functionalities performed by the preprocessing module 310, the filter adjustment module 340, and the post processing module 350.

The speech enhancing module 293 may start with the preprocessing module 601 processing signals and prepare the signals ready for subsequent modules. The preprocessing module 310 may receive inputs from channel 1 and channel 2 and separate the inputs using the segmentation module 610, window the segmented inputs using the windowing module 620, and perform transformation on the inputs using the STFT/WOLA module 630. Functionalities of the segmentation module 610, windowing module 620, and the STFT/WOLA module 630 are similar to the functionalities performed by the segmentation module 410, 510, windowing module 420, 520, and the STFT/WOLA module 430, 530. The pre-processed signals are then passed to the speech enhancing module 293 for further adjustment using different methods for speech enhancement. Unlike the microphone array, the contact transducer 222 is relatively insensitive to the ambient acoustic noises and interferences that are conducted by air. On the other hand, the high-frequency components of the contact transducer 222 signal are seriously attenuated, and the low-frequency components are not exactly the same as those of the acoustic mic signal, due to the transmission loss and the sensitivity of the sensor. The acquired signals contain important side information, such as high-resolution segmentation, pitch epochs, and approximated glottal excitation. In one embodiment, the speech enhancing module 293 may pass the preprocessed signals to the filter adjustment module 320. The filter adjustment module 320 may use various methods for further adjustments on the outputted signals. The filter adjustment module 320 is discussed in further detail below.

The filter adjustment module 602 may use several methods for producing enhanced signals. The filter adjustment module 602 may enhance speech from the user based in part on signals from the microphone array 221 and the contact transducer 222. In one embodiment, the portions of the voice detected by the contact transducer 222 are over a relatively limited frequency band (e.g., below 4 kHz). In contrast, the portions of the voice detected via the microphone array 221 are over the full frequency band of the speech. However, the signals received from the contact transducer 222 for the voice generally have much less noise than the signal from the microphone array 221, because the signals from the contact transducer 222 are less effected by wind noise, ambient sound, etc. The filter adjustment module 602 is configured to augment the detected tissue-based vibrations corresponding to the voice using portions of the identified voice in the detected sounds over a threshold frequency to generate enhanced speech. In this manner, the filter adjustment module 602 may augment the relatively low frequency portions of the speech determined from the VPU with missing frequency content taken from the signals captured by the microphone array based on the outputs 570 and the outputs 470. For example, if a voice of a user is detected in the outputs 570, the filter adjustment module 602 may determine to use the portion of signals detected from the contact transducer 222 and combine with the portion that is missing from the signals detected from the contact transducer 22 with the sounds collected from the microphone array 221. In one embodiment, the filter adjustment module 602 may use an equalization method 741, a model-based methods 742, or a high-pass filter and low-pass filter method for enhancing speech signals.

The equalization method 741 may adjust the balance between frequencies within an audio signal. The equalization method 741 may use a moving averaged magnitude equalizer for increase or decrease the relative amplitude of some frequency bands compared to other bands with boosting and cutting. In some embodiments, the equalization method 741 may boost or cut specific frequency bands or frequencies above or below a certain point to smooth the combined signation. The equalization method 741 may use the acoustic microphone spectrum content to expand the spectrum of the contact microphone. The equalization method 741 may expand the spectrum of the contact microphone and to make it a wide band signal and to enhance its perspectivity.

The high-pass filter and low-pass filter method 743 may use a high-pass filter and a low-pass filter on the audio signals. The high-pass filter and low-pass filter method 743 may use a low-pass filter to attenuates the high frequency contents and preserves the low frequency components. The high-pass filter and low-pass filter method 743 may also use a high-pass filter to attenuates the low frequency components and preserves the high frequency contents. The high-pass filter and low-pass filter method 743 may combine the high frequency spectrum of acoustic microphone with the low frequency spectrum of contact microphone to make an enhanced signal with reduced noise.

The signals outputted from the speech enhancing module 293 may be passed to the post-processing module 350. The post processing module 350 may first use an inverse segmentation module 650 that reverse the effects caused by the segmentation modules 410 and 510. The windowing module 660 may reverse the effects cause by the windowing modules 420 and 520. The combination module 670 may combine the segmented signals produced from the segmentation module 610.

In one embodiment, the audio controller 230 may perform an action associated with the enhanced speech. The action may be, for example, analyzing the speech to determine a user command (e.g., turn up volume), transmitting the speech to another audio system, etc. The audio controller 230 may analyze the speech and if a command is detected from the user speech, the audio controller 230 may send the command to the audio system and/or some other component of the headset based on content of the commands.

Figure 7:
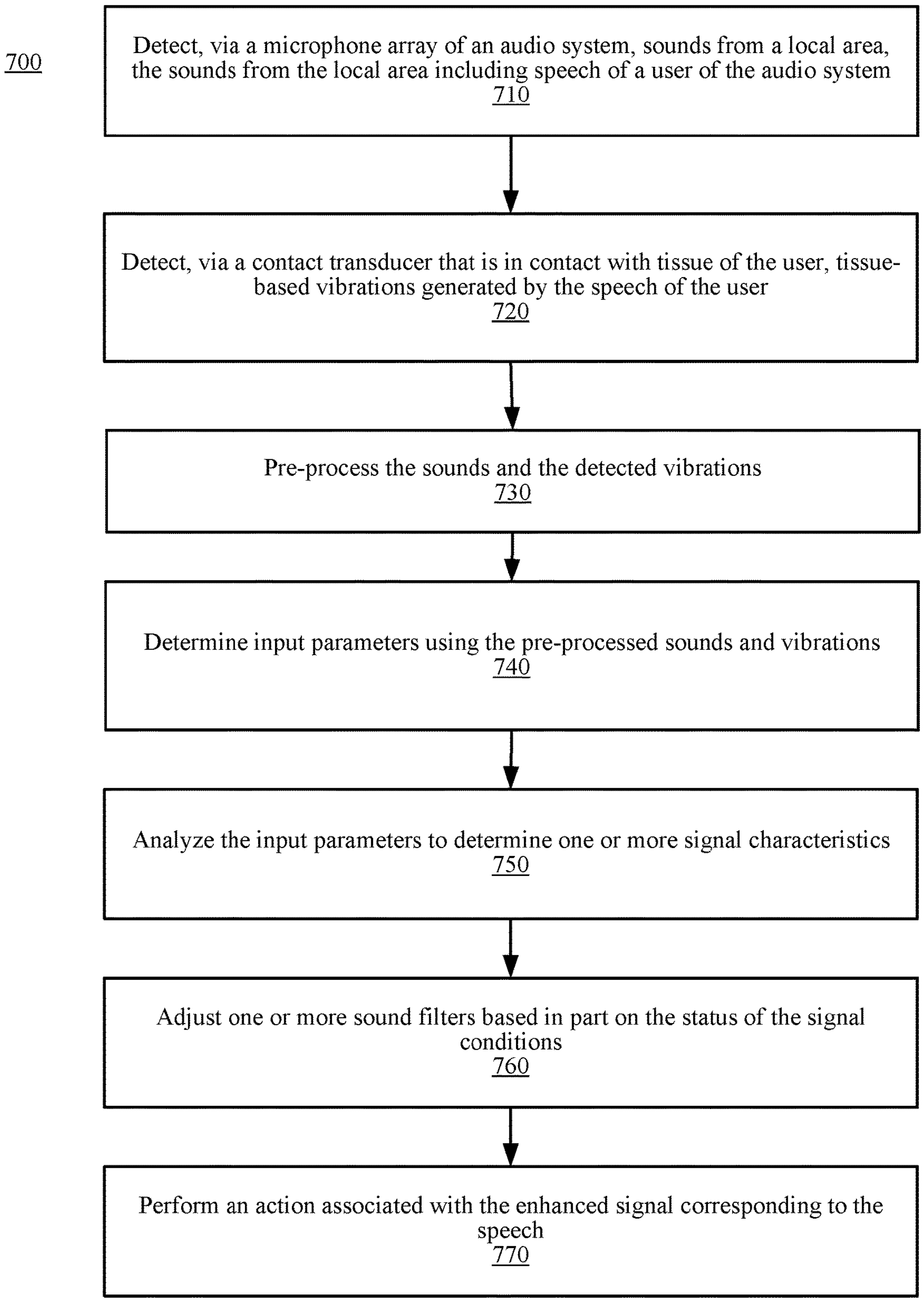
FIG. 7 illustrates an audio processing process performed by the audio processing system, in accordance with one or more embodiments.

FIG. 7 illustrates a process 700 for enhancing signals for a speech performed the audio processing module, in accordance with one or more embodiments. The process shown in FIG. 7 may be performed by components of an audio system (e.g., audio system 200). Other entities may perform some or all of the steps in FIG. 7 in other embodiments. Embodiments may include different and/or additional steps or perform the steps in different orders.

The audio system 200 detects 710 sounds from a local area. The audios system may use a microphone array 221 to detect the sounds as audio stream inputs. The sounds from the local area may include a voice (e.g., speech) of a user of the audio system. The detected sounds may also include environmental noise such as wind noise.

The audio system 200 detects 720 tissue-based vibrations generated by the speech of the user. The audio system may use a contact transducer 222 that is in contact with the tissue of the user. The contact transducer 222 may collect audio signals based on the vibrations of the skin of user's head caused by speaking.

The audio system 200 may use the preprocessing module 310 to preprocess 730 the sounds and the detected vibrations. The preprocessing module 310 may perform segmentation on the input signal. The preprocessing module 310 may perform windowing on the segmented signals. The preprocessing module 310 may perform STFT/WOLA on the audio data after segmentation and windowing.

The parameter determination module 320 may determine 740 input parameters using the preprocessed sounds and vibrations. The parameter determination module 320 may determine 740 a plurality of parameters based on characteristics of the audio signals. The plurality of parameters may include inter-channel coherence, spectrum centroids, and inter-channel RMS difference.

The audio system 200 may use the analysis module 330 to analyze 750 the input parameters to determine one or more signal characteristics, such as whether wind noises are detected in the sounds, and/or whether a voice of a user is detected in the sounds. The analysis module 330 may determine, based on the audio inputs from the microphone array and the contact transducer, whether wind noise is present in the detected sounds, and whether a user's voice is present in the detected sounds.

The filter adjustment module 340 may adjust one or more sound filters based in part on the status of the signal conditions 760. The filter adjustment module 340 may use one or more methods to adjust sounds filter for enhanced signals. The adjustment of filters may include determining that a portion of a speech with frequency lower than a threshold determined based on tissue-based vibrations.

The audio system 200 may perform 770 an action associated with the enhanced signal corresponding to the speech. The audio system 200 may analyze the speech to determine a user command using speech recognition. The audio system 200 may also transmit the enhanced signals or the enhanced speech to another audio system for communication with other users.

Figure 8:
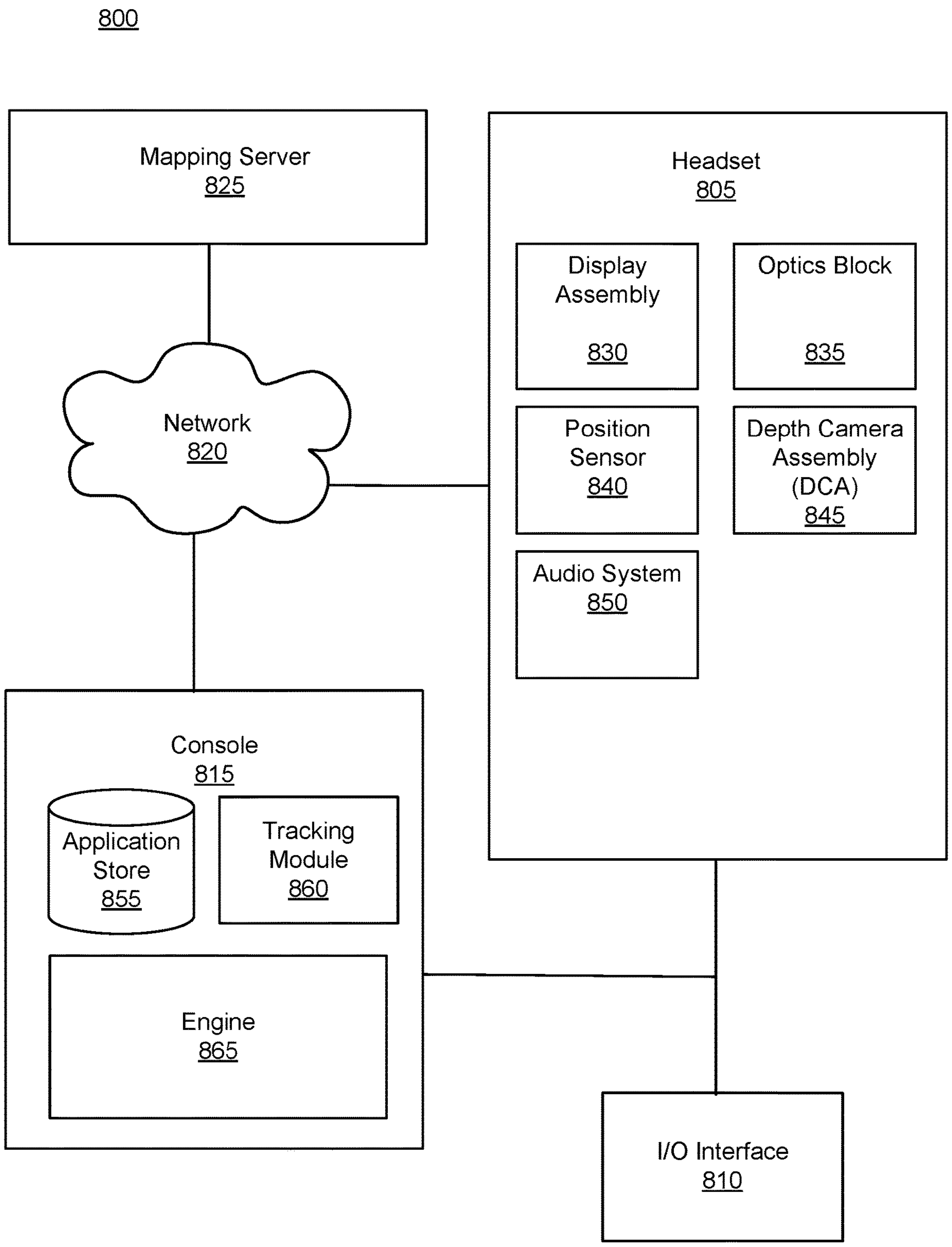
FIG. 8 is a system that includes a headset, in accordance with one or more embodiments The figures depict various embodiments for purposes of illustration only. One skilled in the art will readily recognize from the following discussion that alternative embodiments of the structures and methods illustrated herein may be employed without departing from the principles described herein.

FIG. 8 is a system 800 that includes a headset 805, in accordance with one or more embodiments. In some embodiments, the headset 805 may be the headset 100 of FIG. 1A or the headset 105 of FIG. 1B. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A.

The audio system 850 provides audio content to a user of the headset 805. The audio system 850 is substantially the same as the audio system 200 describe above. The audio system 850 may comprise one or acoustic sensors, one or more transducers, and an audio controller. The audio system 850 may provide spatialized audio content to the user. In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825, and use the sound filters to provide audio content to the user. In one embodiment, the audio system 850 may receive inputs from both a contact transducer and a microphone array to collect audio streams. The audio system 850 may create enhanced audio signals based on whether wind noise or user's voice is detected in the collected audio signals. The audio system 850 may be configured to produce enhanced signals based on the two sources of audio input.

The I/O interface 810 is a device that allows a user to send action requests and receive responses from the console 815. An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. In the example shown in FIG. 8, the console 815 includes an application store 855, a tracking module 860, and an engine 865. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 860 tracks movements of the headset 805 or of the I/O interface 810 using information from the DCA 845, the one or more position sensors 840, or some combination thereof. For example, the tracking module 860 determines a position of a reference point of the headset 805 in a mapping of a local area based on information from the headset 805. The tracking module 860 may also determine positions of an object or virtual object. Additionally, in some embodiments, the tracking module 860 may use portions of data indicating a position of the headset 805 from the position sensor 840 as well as representations of the local area from the DCA 845 to predict a future location of the headset 805. The tracking module 860 provides the estimated or predicted future position of the headset 805 or the I/O interface 810 to the engine 865.

The engine 865 executes applications and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a virtual model describing a plurality of spaces, wherein one location in the virtual model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based on the received information and/or location information, a location in the virtual model that is associated with the local area of the headset 805. The mapping server 825 determines (e.g., retrieves) one or more acoustic parameters associated with the local area, based in part on the determined location in the virtual model and any acoustic parameters associated with the determined location. The mapping server 825 may transmit the location of the local area and any values of acoustic parameters associated with the local area to the headset 805.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
- detecting, via a microphone array of an audio system, sounds from a local area, the sounds from the local area including speech of a user of the audio system;
- detecting, via a contact transducer that is in contact with tissue of the user, tissue-based vibrations generated by the speech of the user;
- determine, in real-time and based on the sounds detected via the microphone array and the tissue-based vibrations detected by the contact transducer, a state associated with wind noise in the sounds and tissue-based vibrations;
- determine, in real-time and based on the sounds detected via the microphone array and the tissue-based vibrations detected by the contact transducer, a state associated with a voice of the user in the sounds and tissue-based vibrations; and
- combining, based on the determinations of the states associated with wind noise and the voice of the user, low-frequency components of the tissue-based vibrations detected by the contact transducer with high-frequency components of the sounds detected by the microphone array.

2. The method of claim 1, wherein the state associated with wind noise is determined via an inter-channel coherence analysis of the sounds and the tissue-based vibrations.

3. The method of claim 1, wherein the state associated with the voice of the user is determined using a spectrum centroid analysis of the tissue-based vibrations.

4. The method of claim 1, wherein the combining further comprises attenuating frequency components below a threshold in the sounds detected by the microphone array.

5. The method of claim 4, wherein the combining further comprises augmenting missing frequency components in the tissue-based vibrations with corresponding components from the sounds detected by the microphone array.

6. The method of claim 1, wherein determining the state associated with wind noise comprises calculating a root-mean-square difference between a first signal representing the sounds detected by the microphone array and a second signal representing the tissue-based vibrations detected by contact transducer.

7. The method of claim 1, wherein the combining is performed in response to the state of the voice of the user indicating that speech is present.

8. The method of claim 1, wherein the combining comprises adjusting one or more sound filters based on the states associated with wind noise and the voice of the user in the sounds and tissue-based vibrations.

9. The method of claim 1, further comprising analyzing an output of the combining to determine a user command.

10. The method of claim 1, wherein the contact transducer is configured to be in contact with a head of a user.

11. An audio system comprising:
- a microphone array configured to detect sounds from a local area, the sounds from the local area including a voice of a user of the audio system;
- a contact transducer configured to be in contact with a portion of a head of the user, and detect tissue-based vibrations that are generated by the voice of the user; and
- a controller configured to:
  - determine, in real-time and based on the sounds detected via the microphone array and the tissue-based vibrations detected by the contact transducer, a state associated with wind noise in the sounds and tissue-based vibrations;
  - determine, in real-time and based on the sounds detected via the microphone array and the tissue-based vibrations detected by the contact transducer, a state associated with a voice of the user in the sounds and tissue-based vibrations; and
  - combine, based on the determinations of the states associated with wind noise and the voice of the user, low-frequency components of the tissue-based vibrations detected by the contact transducer with high-frequency components of the sounds detected by the microphone array.

12. The audio system of claim 11, wherein the controller is further configured to determine ed with the wind noise by performing an inter-channel coherence analysis of the sounds and the tissue-based vibrations.

13. The audio system of claim 11, wherein the controller is further configured to determine the state associated with the voice of the user via a spectrum centroid analysis of the tissue-based vibrations.

14. The audio system of claim 11, wherein the controller is configured to perform the combining of the low-frequency components and the high-frequency components by attenuating frequency components below a threshold in the sounds detected by the microphone array.

15. The audio system of claim 11, wherein controller is configured to perform the combining of the low-frequency components and the high-frequency components by augmenting missing frequency components in the tissue-based vibrations with corresponding components from the sounds detected by the microphone array.

16. A non-transitory computer-readable storage medium comprising memory with executable computer instructions encoded thereon that, when executed by one or more processors of an audio system, cause the audio system to:
- detect, via a microphone array of the audio system, sounds from a local area, the sounds from the local area including speech of a user of the audio system;
- detect, via a contact transducer that is in contact with tissue of the user, tissue-based vibrations generated by the speech of the user;
- determine, in real-time and based on the sounds detected via the microphone array and the tissue-based vibrations detected by the contact transducer, a state associated with wind noise in the sounds and tissue-based vibrations;
- determine, in real-time and based on the sounds detected via the microphone array and the tissue-based vibrations detected by the contact transducer, a state associated with a voice of the user in the sounds and tissue-based vibrations; and
- combine, based on the determinations of the states associated with wind noise and the voice of the user, low-frequency components of the tissue-based vibrations detected by the contact transducer with high-frequency components of the sounds detected by the microphone array.

17. The non-transitory computer-readable storage medium of claim 16, wherein the executable computer instructions cause the audio system to determine the state associated with the wind noise by performing an inter-channel coherence analysis of the sounds and the tissue-based vibrations.

18. The non-transitory computer-readable storage medium of claim 17, wherein the executable computer instructions cause the audio system to determine the state associated with the voice of the user by using a spectrum centroid analysis of the tissue-based vibrations.

19. The non-transitory computer-readable storage medium of claim 16, wherein the executable computer instructions cause the audio system to combine the low-frequency components and the high-frequency components by attenuating frequency components below a threshold in the sounds detected by the microphone array.

20. The non-transitory computer-readable storage medium of claim 1, wherein the executable computer instructions cause the audio system to selectively combine the low-frequency components and the high-frequency components by augmenting missing frequency components in the tissue-based vibrations with corresponding components from the sounds detected by the microphone array.

* * * * *